United States Patent
Langer et al.

(10) Patent No.: US 10,128,872 B2
(45) Date of Patent: Nov. 13, 2018

(54) ENABLING RADIO FREQUENCY MULTIPLEXING IN A WIRELESS SYSTEM

(71) Applicant: Intel IP Corporation, Santa Clara, CA (US)

(72) Inventors: Andreas Langer, Lohhof (DE); Thomas Bruder, Grafing (DE)

(73) Assignee: Intel IP Corporation, Santa Clara, CA (US)

( * ) Notice: Subject to any disclaimer, the term of this patent is extended or adjusted under 35 U.S.C. 154(b) by 120 days.

(21) Appl. No.: 14/835,828

(22) Filed: Aug. 26, 2015

(65) Prior Publication Data
US 2017/0063404 A1 Mar. 2, 2017

(51) Int. Cl.
*H04B 1/00* (2006.01)
*H04W 72/04* (2009.01)

(52) U.S. Cl.
CPC .......... *H04B 1/0057* (2013.01); *H04B 1/006* (2013.01); *H04W 72/0453* (2013.01)

(58) Field of Classification Search
CPC ...... H04B 1/005; H04B 1/0057; H04B 1/006; H04B 1/0064; H04B 1/0067; H04B 1/0413; H04B 1/10; H04B 1/16; H04B 1/40; H04B 1/44; H04B 7/0602; H04B 7/0613; H04B 7/0689; H04B 7/0874; H04B 7/2621; H04B 15/00; H04L 5/001; H04W 48/18; H04W 72/0453; H04W 76/048

See application file for complete search history.

(56) References Cited

U.S. PATENT DOCUMENTS 4,612,571 A * 9/1986 Moon .................. H03H 7/0107
333/174
5,604,747 A * 2/1997 Callas ..................... H01P 1/213
333/132

(Continued)

FOREIGN PATENT DOCUMENTS

EP 2693644 A1 2/2014

OTHER PUBLICATIONS

Apaydin et al., Design of Diplexers with Prescribed Crossover Loss Using Singly Terminated Filters, Apr. 14, 1994, IEEE, 1994 Proceedings of 7th Mediterranean Electrotechnical Conference.*

(Continued)

*Primary Examiner* — Eric Nowlin
(74) *Attorney, Agent, or Firm* — Eschweller & Potashnik, LLC

(57) ABSTRACT

A communication device comprises a set of filters that are selectively coupled to different groups of front end ports and an antenna port to form a diplexer, a single filter or a no filter connection for transmission and reception of different data signals. A processor operates to selectively determine or combine filters and couple them to the front end ports and the antenna port based on an operational mode and a frequency separation of signals operating in different frequency ranges of different operating bands. The operational mode can alter between a carrier aggregation mode, in which more than one operating band is aggregated during transmission or reception, and a non-carrier aggregation mode, in which only one filter, no filters or the diplexer is bypassed. The insertion loss of the transmissions and receptions can also be actively decreased.

21 Claims, 8 Drawing Sheets

(56) References Cited

U.S. PATENT DOCUMENTS

| | | | | |
|---|---|---|---|---|
| 6,965,279 B2* | 11/2005 | Carson | H01Q 21/0025 | 333/116 |
| 8,350,642 B2* | 1/2013 | Jensen | H01P 5/16 | 333/126 |
| 9,380,253 B2* | 6/2016 | Petrovic | H04N 5/50 | |
| 9,467,191 B2* | 10/2016 | Weissman | H04B 1/0057 | |
| 9,941,908 B2* | 4/2018 | Bauder | H04B 1/0057 | |
| 2004/0168200 A1* | 8/2004 | Richter | H04N 7/104 | 725/127 |
| 2005/0035825 A1* | 2/2005 | Carson | H01Q 21/0025 | 333/117 |
| 2005/0168301 A1* | 8/2005 | Carson | H01Q 21/0025 | 333/117 |
| 2008/0212283 A1* | 9/2008 | Chernyakov | H01L 23/3677 | 361/709 |
| 2010/0007433 A1* | 1/2010 | Jensen | H01P 5/16 | 333/132 |
| 2010/0052813 A1* | 3/2010 | Okabe | H03H 7/463 | 333/132 |
| 2013/0039227 A1* | 2/2013 | Ji | H04B 1/006 | 370/277 |
| 2013/0051261 A1* | 2/2013 | Kazmi | H04B 7/0693 | 370/252 |
| 2013/0250819 A1 | 9/2013 | Khlat et al. | | |
| 2014/0030990 A1* | 1/2014 | Smith | H04B 1/0475 | 455/114.1 |
| 2014/0092795 A1 | 4/2014 | Granger-Jones | | |
| 2015/0117280 A1* | 4/2015 | Khlat | H04B 1/50 | 370/297 |
| 2015/0117281 A1* | 4/2015 | Khlat | H03H 7/463 | 370/297 |
| 2015/0303952 A1* | 10/2015 | Zeng | H04L 5/00 | 370/297 |
| 2015/0304596 A1* | 10/2015 | Petrovic | H04N 5/50 | 348/731 |
| 2016/0112072 A1* | 4/2016 | Bauder | H04B 1/0057 | 370/297 |
| 2016/0359607 A1* | 12/2016 | Bojer | H04B 1/0057 | |
| 2017/0094662 A1* | 3/2017 | Ebihara | H04L 5/14 | |
| 2017/0373493 A1* | 12/2017 | Morf | H02H 9/046 | |

OTHER PUBLICATIONS

Extended European Search Report for European Application No. 16182068.3-1874 dated Jan. 10, 2017.

* cited by examiner

US 10,128,872 B2

ENABLING RADIO FREQUENCY MULTIPLEXING IN A WIRELESS SYSTEM

FIELD

The present disclosure relates to wireless communications, and more specifically, enabling radio frequency multiplexing in a wireless system.

BACKGROUND

Wireless communication systems can operate to support carrier aggregation (CA) or other wireless communication schemes that have parallel transmission or reception in different operating bands, which facilitate greater data rates for transmitting or receiving data. In such wireless communication systems having simultaneous transmission or reception in different, aggregated operating bands (e.g., code division multiple access (CDMA), global system for global communications (GSM), long-term evolution (LTE), LTE-advanced (LTE-A) or the like), multiplexing the two or more operating bands and the number of antennas can be a challenge. Depending on a frequency separation or gap between the aggregated operating bands, the number of operating bands that are being aggregated and the number of antennas being utilized, existing solutions can be expensive, difficult to handle, or provide limited flexibility to support different CA combinations.

DETAILED DESCRIPTION

Figure 1:
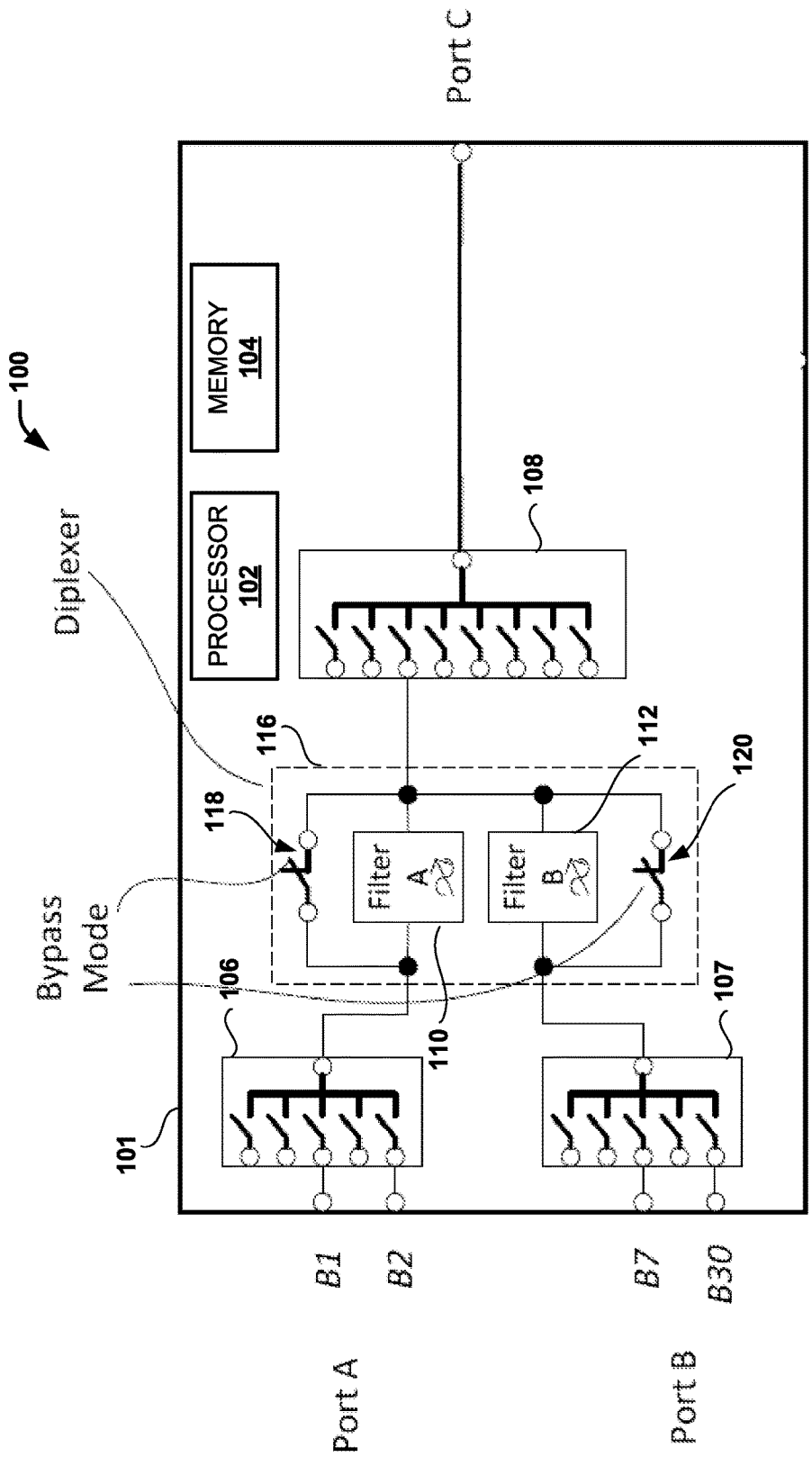
FIG. 1 is a block diagram illustrating a wireless communication system or device according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of wireless/mobile communication schemes involving simultaneous transmission or reception, as in carrier aggregation, various aspects are described in this disclosure for wireless systems or devices to dynamically and selectively activate diplexer(s), which are configured to separate/combine signals in simultaneous transmissions or receptions of data based on a mode of operation (e.g., a carrier aggregation mode, a non-carrier aggregation mode, or the like), a frequency separation between different frequency ranges, or between the signals operating within for one or more different operating bands.

The mode of operation, for example, can be a non-carrier aggregation mode or a carrier aggregation mode. The non-carrier aggregation mode can refer to an operation of a communication device (e.g., a mobile device, a wireless phone, a laptop, a specialized computer, or other communication device) that transmits or receives using a single portion of the wireless spectrum within a single operating band without the use of diplexer. Operation in the non-carrier aggregation mode enables a wireless or mobile device to activate only one filter, or no filters, instead of two filters forming the diplexer. The non-carrier aggregation mode can comprise sub-modes or sub-operation that enable the bypassing of a diplexer already formed (e.g., via one or more switches), or enable the formation of only a single filter for attenuating signals being coupled to receive or transmission front end ports of receiver or transmission paths and to an antenna port for an antenna connection. Both of these sub-modes or operations of the non-carrier carrier aggregation mode function to decrease the insertion loss in non-carrier aggregation operations, while still enabling the use of diplexers to be dynamically utilized for carrier aggregation.

The carrier aggregation mode can refer to a variety of carrier aggregation configurations for the communication device comprising an inter-band carrier aggregation, in which the aggregated portions of the wireless spectrum are located in different operating bands, or intra-band carrier aggregation, in which the aggregated portions of the wireless spectrum are located within a same operating band, but are not directly adjacent to one another in frequency or frequency range. The wireless or mobile device dynamically operates in various modes on the fly, while being able to decrease insertion loss from one mode to another, as well as between bands.

The wireless communication system can dynamically form a diplexer and associated connections to the diplexer based on the non-carrier aggregation mode and the carrier aggregation mode. When operating in the carrier aggregation mode, at least two filters are selected from among three or more filters and configured together to form a diplexer for transmitting or receiving data simultaneously in different operating bands or different frequency ranges. This diplexer formation can be based on an amount of the frequency gap or frequency separation between the data signals being simultaneously transmitted or received. When operating in the non-carrier aggregation mode, the diplexer can be bypassed with one or more switches, or one filter is activated or selected for transmitting/receiving of the different data signals.

In other embodiments, the connections of front end ports to filters that selectively form a diplexer, a single filter connection or a no filter connection can vary depending on one or more factors or criteria. For example, the selection of front end ports or the formation of the filters can depend on the frequency separation between any two different data signals, the separation between their associated frequency ranges or operating bands, or the mode of operation (i.e., a non-carrier aggregation mode or a carrier aggregation mode). A first set of front end ports can correspond to a higher frequency range than a second set of front end ports, for example. Likewise, a first filter can correspond to the first set of front end ports as a high pass filter, and a second filter can correspond to the second set of front end ports as a low pass filter, for example, or vice versa. Each set of ports (first and second set of front end ports) can have a plurality of front end ports that correspond to different frequencies within a same operating band of a frequency range. These front end ports and their associated set of front end ports can be dynamically and selectively coupled to the filter combination in response to the formation of a diplexer, or selectively coupled individually in a non-carrier aggregation communication mode to a single filter or a filterless connection.

In addition or alternatively, the filters being combined or connected to the one or more front end ports and the antenna port can be dynamically tuned. The tuning can be utilized to dynamically adjust a filter characteristic (e.g., an out-of-band attenuation or impedance) in order to decrease insertion losses and increase signal strength. As such, the different operating modes of the communication device function to decrease the insertion loss in non-carrier aggregation operations, while still enabling the use of diplexers to be dynamically utilized for carrier aggregation, and dynamically altering the out-of-band attenuation or impedance to further optimize the signal strength in both modes. Additional aspects and details of the disclosure are further described below with reference to figures.

Referring to FIG. 1, illustrated is a wireless communication system or device in accordance with various embodiments being described. A wireless communication system 100 can include a mobile or wireless device 101 (e.g., a mobile device, a computing device, a processing device or the like) that is configured to communicate in one or more different operating bands (e.g., CDMA, GSM, LTE, LTE-A, or the like) with different data streams simultaneously or concurrently in different frequency ranges, such as with carrier aggregation (CA) or other simultaneous communication schemes for achieving higher data rates. The device 101 can be a radio frequency (RF) device for communicating RF signals, an acoustic device for communicating acoustic signals, or other data signal communication device, such as a computer, a personal digital assistant, a mobile phone or smart phone, a tablet PC, a modem, a notebook, a router, a switch, a repeater, a PC, network device, base station or other wireless device that can operate to communicate with a network or other device according to one or more different communication protocols or standards and simultaneous communication schemes (e.g., carrier aggregation or the like).

To achieve higher data rates via the device 101, two or more component carriers (CC) can be aggregated to support a transmission or receive bandwidth (e.g., up to about 100 MHz or greater). For example, the wireless device 101 can utilize inter-band carrier aggregation to receive or transmit in two different operating bands at about the same time or simultaneously. Because operating bands and frequencies of signals being transmitted or received in the device 101 can be different, overlap and interfere in different ways, especially when utilizing a diplexer 116 as illustrated, various configurations and operations are described to lower cost, and increase performance.

In one example, FIG. 1 illustrates an example where receive (Rx) chains or pathways are processed in two different bands, such as receiving in one band (e.g., band 1) and another band (e.g., band 8, or another band). For example, one band, such as band 8 could operate in a first frequency range (e.g., 880 MHz to 960 MHz), in which the uplink or transmitting band frequency can be in the range of about 880 MHz to 915 MHz and the downlink or receiving frequency range can be in the range of about 925 MHz TO 960 MHz. Another band, for example, can be a different frequency range (e.g., 1920 MHz to about 2170 MHz) for uplink and downlink operating bands. Regardless of the operating bands, when the frequency separation is close between two bands being aggregated in carrier aggregation, a standard diplexer is difficult to use, potentially lending to more expensive solutions other than diplexers for separation and combination of operating bands of signals. For example, a frequency separation of about 750 or 800 MHz between the two operating bands operating in carrier aggregation can be utilized, but embodiments of the wireless communication device being described enable operation to occur in carrier aggregation and non-carrier aggregation when bands have much smaller frequency separation than this, and are closer together (e.g., less than 750 MHz of separation), such as 400 MHz, 300 MHz, or less.

The device 101 thus is configured to operate a change in the characteristic of the diplexer 116 depending at least on the mode of operation, the bands of simultaneous operation, or depending on the frequency separation between the bands of simultaneous operation. The mode of operation refers to multi-transmission(s) or reception(s) and single transmission(s) or reception(s) being functional. Multi-transmission refers to at least two signals being simultaneously transmitted in at least two different bands, and multi reception means that at least two signals are simultaneously received that are located in at least two different bands. The characteristic of the diplexer 116 is at least given by the diplexer 116 being enabled and the diplexer 116 being bypassed. If the diplexer is tunable, as described in more detail below with respect to FIG. 3, the characteristics may comprise the cross-over frequency of the diplexer and the out-of-band attenuation or impedance in each branch of the diplexer 116.

Different data signals can be present in two different bands being processed via the device 101, which simultaneously combines the different data streams in carrier aggregation mode. Two different bands associated with different operating bands of different frequency ranges with a frequency separation amount between them can be combined by the diplexer 116, which is usually the last element of the chain, while comprising a combination of a high pass and low pass filtering operations via the two filers, filter A 110 and the filter B 112, respectively. The antenna port C, for example, can also be configured to receive the signal simultaneously in another band via an antenna element or antenna (not shown), and so the device operates to receive or transmit in different modes of operation (e.g., carrier aggregation mode, and non-carrier aggregation mode).

The diplexer 116 operates to separate the data streams according to signal frequency, which means the device 101 can process one common signal and two outputs, where one output is one frequency and the other is another frequency that is lower or higher in range than the first one. A triplexer (not shown), for example, separates three different frequency ranges at a time, and usually operates with three different filters. A quadplexer (not shown) can be used to combine Rx and Tx at different frequencies simultaneously. Quadplexer has different filters within in shown depending on different frequency ranges.

Although the embodiments described herein relate to diplexers being formed or operational coupled to the antenna port or front end ports (corresponding to transmit or receive chains) in carrier aggregation mode, additional filters from just two are not necessarily precluded and also envisioned, such as with a triplexer or the like. Having a high frequency separation, however, has typically been implemented for carrier aggregation with a diplexer, but where bands are closer together more expensive multiplexer devices, such as a quadplexer has been typically used having film bulk acoustic resonator (FBAR) filters or bulk acoustic wave (BAW) filters, for example. In various cases where the frequency separation is high, for example, with a low-intermittent range or low bands from 700 to 900 MHz (the US bands) and a mid-band frequency range that starts at about 1700 MHz, with separation between the two ranges being about 800 MHz from the ranges where the bands are located, a diplexer is a less expensive solution. However, the device 101 can be formed with a diplexer 116 for band aggregation where the separation is smaller than 800 MHz. In embodiments being disclosed, RF multiplexing can be implemented for different bands where duplexing does not necessarily work well, but also lower cost compared to the FBAR/BAW solution. For example, the filter A 110 and filter B 112 can utilize surface acoustic wave (SAW) filter technology as an example, but other filters technologies can also be used as well, which can be similar to SAW filters, for example, at lower cost. In one example, a filter can be combined or a lumped filter with various discrete elements (e.g., capacitors, inductors, etc.) that are fully integrated on a silicon on integrator (SOI), as a so-called passive integration, or be partially integrated with an inductor or other component as a discrete, off-chip component due to higher Q factor and smaller cost, in which capacitors can be integrated on the SOI, for example, together with the switches or switching elements described herein.

The device 101 of FIG. 1 comprises the diplexer 116 as a switchable diplexer 116 that can be implemented according to various different architectures, in addition to the particular example being illustrated, and is not a restricted to any one implementation. Our claims to method are actually a very specific diplexer implementation.

The device 101, such as via the processor 102 with memory 104, can operate to dynamically connect the filters A 110 and B 112 in a combination for creating the diplexer 116, which can be low pass filter(s), high pass filters(s), band pass filter(s), other types of filters or any combination thereof. The diplexer 116, in carrier aggregation mode, can be connected between the port C and ports A or B, for example, in order to enable bands that are closer together with a lower frequency separation as well as with higher frequency separations, without increasing insertion losses. In general for diplexers, as the frequency separation gets smaller, then the loss of the diplexer increases, and so the closer the two ranges are together the higher the insertion loss of the diplexer 116. Insertion loss can be referred to as the loss of the signal power resulting from the insertion of the device or component (e.g., the diplexer) into transmit or receive paths/lines, and can be expressed in decibels (dB), for example. With the bands B1, B2, B7 and B30, for example, as being received or transmitted via the front end ports A and B, the frequency separation being utilized in carrier aggregation can start from about 100 MHz between the bands, and be smaller or larger during dynamic communication operations.

In one embodiment, pair of bands can be dynamically combined via the first set of front end switches 106 and the second set of front end switches 107, in which the frequency separations between the bands can be very small (e.g., less than 400 MHz or smaller). For example, band B30 can start at 2305 MHz and band B1 stops at 2170 MHz; thereby the two bands (B1 and B30) can have a frequency separation of 135 MHz between them. The ports of port A and port B can vary in that one is higher or lower than the other set of ports associated therewith, for example, so that the higher frequency associated ports are filtered through a high pass filter, and the other set of ports more of a low pass filter. Other filters can also be utilized as filter A 110, or filter B 112, such as a band pass filter or the like.

In another embodiment, the device 101 operates to mitigate, reduce or eliminate the insertion loss resulting from a smaller frequency separation of operation caused by the diplexer 116, by operating a bypass mode as part of the non-carrier aggregation operating mode. Due to the low frequency separation with a diplexer, the insertion loss can be high when filter A 110 and B 112 are used to combine bands B1 and B30 for example. In this situation, there can be a high insertion loss because both bands are close together, and while this higher insertion loss could be acceptable in carrier aggregation mode when operating in B1 and B30 for example, in non-CA mode (legacy mode) where only a single band is operating, the insertion loss can be too high in comparison and becomes unacceptable. The CA mode is not a normal mode of operation, but depends on the network conditions and the operator, which means it is not a standard operation as with a single band operation. Rather, than sacrificing the performance in a single band operation (non-carrier aggregation mode), the device 101 utilizes a bypass mode when using a single band operation.

In the bypass mode of operation, the diplexer 116 becomes bypassed completely to reduce the insertion loss in non-CA mode or legacy mode where only one band is processed. Thus, the compromise of using the diplexer 116 to combine bands at a lower frequency of separation at the expense of a higher loss due to the low frequency separation becomes reduced or eliminated. For example, the processor 102 can signal bypass switches 118 and 120 to effectively disconnect the diplexer 116 comprising filter A 110 and filter B 112 and thereby mitigate the source of insertion losses for the non-carrier aggregation mode. The processor 102 can signal bypass switch 118 to close, thereby passing bands from port B through filter B 112, signal bypass switch 120, thereby passing bands from port A through filter A 110, or signal both switches 118 and 120 to close to provide no filtering for bands from ports A and B. Other configurations or architectures are also envisioned, in which the bypass switches could be utilized in direct line with the filters A 110 or B 112, or also with other additional kinds of filters or sets of ports corresponding to other different bands or frequency ranges in comparison to those being discussed and illustrated.

Figure 2:
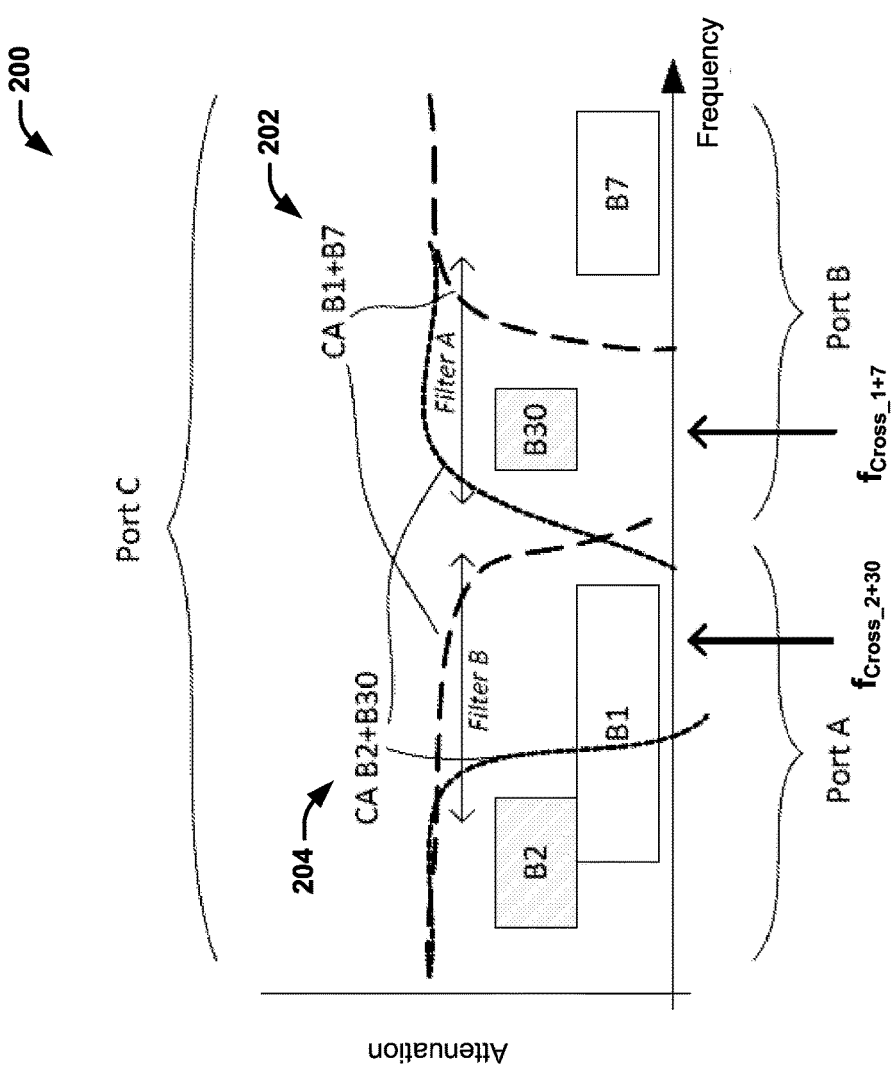
FIG. 2 is a graph illustrating filter characteristic curves of filters for a diplexer according to various aspects described.

Referring to FIG. 2, illustrated is an example of frequency ranges and separations between example bands and their corresponding transfer function characteristics. In particular, frequency ranges 200 are illustrated, in which frequency separations are occupied in CA mode by CA bands B2+B30 and CA bands B1+B7, for example.

As one example is the mapping of a low band frequency range (~700 . . . 900 MHz) and of a mid-band frequency range (1700 . . . 2100 MHz) to a single antenna port C. Here, the frequency separation of the bands is approximately 800 MHz. Due to a large frequency separation, the insertion loss of the diplexer can be typically around 0.5 dB. A loss of 0.5 dB is accepted in many applications. Meanwhile, there are more than 200 different CA combinations defined by 3GPP standards and further CA combinations are in preparation. There is a trend, for example, towards aggregating three, four, five or even more bands. The CA combinations get more challenging to implement in CA due to small frequency separation between the bands and due to an increasing number of CA combinations to be supported in a single front end design of the device 101, for example.

In one embodiment, port A can be used for a lower frequency ranges (e.g., operating bands B1 and B2), and port B used for the higher frequency ranges (e.g., operating bands B30 and B7), while port C is the common antenna port that can attach to one or more antennas for receiving or transmitting. In particular, B1, B2, B30, B7 are bands defined by 3GPP. The corresponding uplink- and downlink operating bands can be for instance found in 3GPP TS 36.101.

In the case of CA B1+B7, for example, the frequency separation is about 330 MHz (band B1 on downlink (DL) is about 2110 to 2170 MHz and band B7 for uplink (UL) is about 2500 to 2570 MHz. The frequency separation is thus significantly smaller than more traditional separations of about 800 MHz with a diplexer utilizing SAW filters or similar technology. If a standard diplexer without anything more is used to multiplex B1 and B7, for example, the insertion loss could be from 1 to 1.5 dB, in which such a high insertion loss impacts transmission Tx and reception Rx operations. Transmission Tx performance, for example, can suffer from a higher current consumption, and reception RX performance can suffer from a lower sensitivity. It is important to recognize that the higher loss carries over into the non-CA operation where the diplexer 116, for example, is actually not needed. The insertion loss of the diplexer 116 connected, for example, can also be present for other bands that are connected to the same diplexer, but are not necessarily aggregated with other bands. If a diplexer is designed to support this CA combination then all bands and all modes (CA, non-CA) can suffer from the higher losses due to aggregation of B1+B7 alone. However, the embodiments described above and herein operate to mitigate such loss, such as via dynamic operation of the bypass switches 118 or 120.

Another example illustrated is the aggregation of operating bands B2 and B30. Here, the band separation is about 315 MHz causing similar diplexer insertion losses as B1+B7 that carry over into other aggregations of bands (not shown), the device overall, and into non-carrier aggregation modes via one of filter A 110 or filter B112, or a filter-less connection to the antenna switches 108, which connect one or more antenna ports (e.g., port C) with one or more diplexers, filters, or filter-less connections to one or more front end ports.

Transfer curves 202 and 204 correspond to different band aggregations of operating bands along frequency (the x or horizontal axis) and attenuation (the y or vertical axis). The diplexer 116 could correspondingly have different filters, the same filters or a combination dynamically activated or connected within the device 101 for processing the signals differently based on the operating bands being aggregated or as selected by the processor 102. The transfer curves 202, for example, have characteristics from the B1 filter and B7 filter, which are combined to form the diplexer 116 having filters for the CA B1+B7, and can be from different filters than filer A 110 and filter B 112, or one or more same filters that could have been tuned in their filter characteristics. The same is also illustrated for the CA B2+B30 bands by the transfer curves 204, in which the filters A 110 or B 112 could be activated to form the diplexer 116 in response to the particular aggregation of the operating bands B2 and B30.

In one embodiment, the diplexer 116 is optimized via the processor 102 (e.g., as a baseband processor or radio frequency communication integrated circuit) for aggregation of bands B2+B30, which would have different filters or be tuned differently as other bands being aggregated, for example, such as for B1+B7 and vice versa. If both CA combinations have to be supported by a single diplexer then the separation between B1 and B30 can be gated or done by further gating, tuning or combining via one or more different switches to an antenna via port C. The band frequency separation or frequency gap would be about 135 MHz, in which for reception Rx operations for band B1 the range would be about 2110 to 2170 MHz, and the transmission Tx operations for band B30 would be 2305 to 2315 MHz, for example. The impact on insertion loss due to small frequency separation can thus be quite significant. For a frequency separation of 135 MHz and a diplexer cross-over frequency of around 2240 MHz, the insertion loss can exceed 2 dB, for example. Thus, the impact on the insertion loss for the non-CA mode is no longer acceptable; at least 2 dB less RX sensitivity, more than 100 mA higher power amplifier current consumption for a power amplifier (not shown) at max power would result for communication operations in the device 101. The advantages of a diplexer are its low cost and the wideband capability enabling multiplexing of large frequency ranges that are separated in frequency (e.g. 700 to 900 MHz+1700 to 2200 MHz) where each frequency range might consist of multiple operating bands. The downside is that standard diplexers lose acceptance if the band frequency separation gets low causing higher losses that impact the performance in all modes and especially in non-CA mode.

To minimize the impact on non-CA mode and to simultaneously support difficult band combinations like B1+B7 and B2+B30, the bypassing mode is utilized as discussed above with respect to FIG. 1. The diplexer 116 can be enhanced by adding a bypass mode (as a switched diplexer) to reduce insertion losses while increasing efficiency, and further by means of changing the diplexer characteristic (as a tunable diplexer) as further detailed below in FIGS. 3 and 4, for example.

Figure 3:
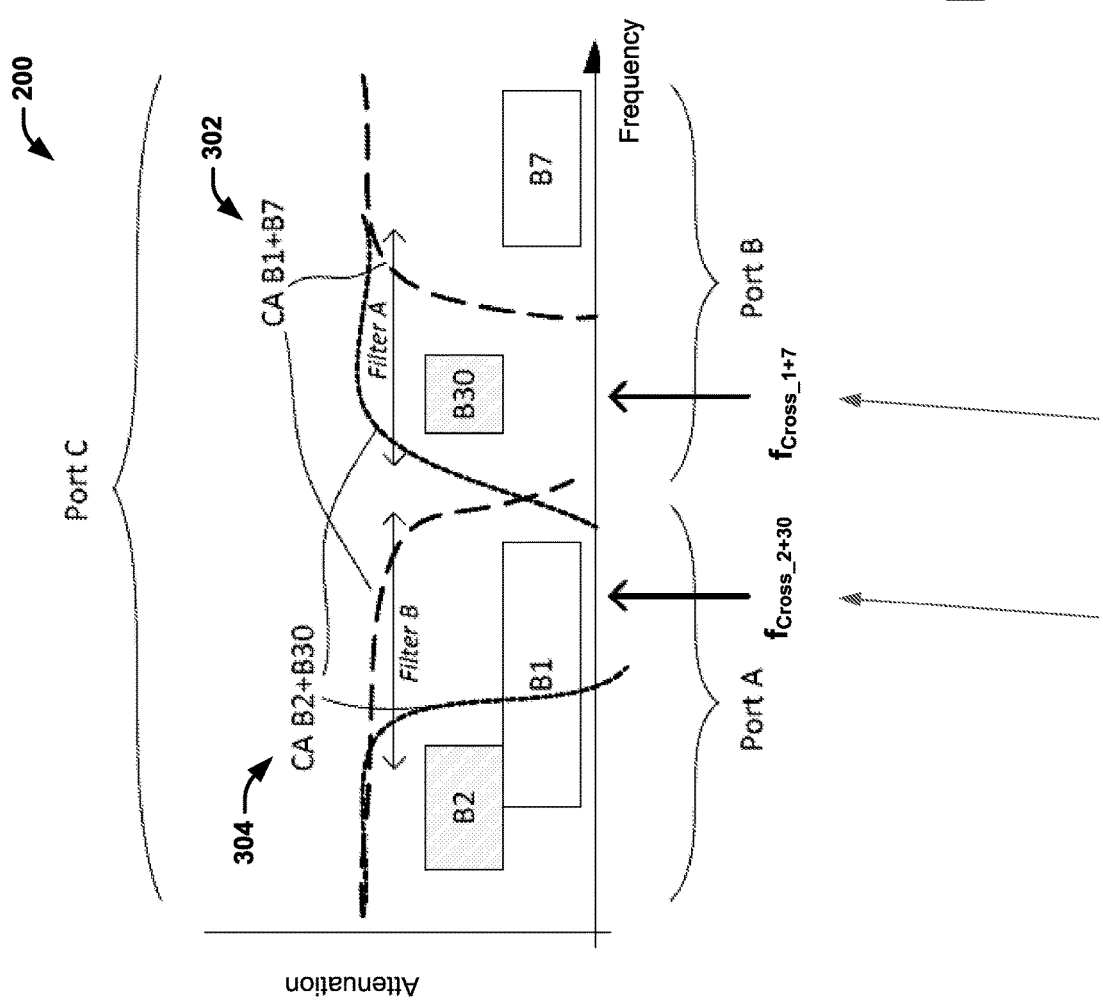
FIG. 3 is another graph illustrating filter characteristic curves of filters for a tunable diplexer according to various aspects described.

Referring now to FIG. 3, illustrated is an example of aggregated operating bands with a cross over frequency. For example, operating bands B2 CA bands B2+B30 as referenced by curves 304 or CA B1+B7 as referenced by curves 302, respectively, have transfer characteristics represented by the transfer curves 302 and 304.

In an additional embodiment, the diplexer 116 is configured to operate a tunability function, in which the diplexer 116 or filters A 110 and B 112 forming the diplexer 116 are able to dynamically tune filter characteristics based on the mode of operation, aggregated bands and a frequency separation. In the case of multi-transmission or multi-reception during the carrier mode of operation, a cross-over frequency ($f_{cross\_1+7}$, $f_{cross\_2+30}$) and out-of-band attenuation characteristic of the diplexer 116 are dynamically selected depending on the frequency separation between the operating bands or the frequency ranges occupied by the simultaneously operating bands. For example, the cross-over frequency of the diplexer 116 can be selected via the processor 102, which also selects the bands being aggregated, depending on the frequency ranges occupied by the aggregated bands.

As an example, the cross-over frequency ($f_{cross\_1+7}$, $f_{cross\_2+30}$) can be selected by the processor 102 as a mid-frequency between simultaneously operating bands. The out-of-band attenuation as a filter characteristic, for example, can be selected depending on the band frequency separation. A smaller frequency separation requires steeper filter skirts (e.g., higher Q factors in the filters A or B) to achieve the attenuation and high impedance in the other simultaneously operating band being aggregated or potentially being aggregated form among bands being detected (via the processor or other component) at the device 101.

Further aspects are demonstrated with the graph 300 of FIG. 3 including frequency ranges (e.g., as blocks of bands B1, B2, B7 and B30) and transfer curves 302 and 304. For example, in selecting to aggregate B1+B7, the cross-over frequency can, for example, be chosen to be around 2340 MHz, and for B2+B30~2150 MHz. Without tunability of the diplexer 116, or of the filters 110 or 112, the cross-over frequency of 2150 MHz would prevent B1 in receiving Rx operations since the cross-over frequency is located in B1 receiving Rx frequency range. Therefore, the filters 110 and 112, as well as the diplexer is further configured as tunable with respect to the filter characteristics (e.g., cross over frequency, out of band attenuation, out-of-band impedance, or other similar characteristics for CA, such as a Q factor).

In another example, if both CA combinations (CA bands B2+B30 and CA B1+B7) are supported by the same diplexer, then the separation between B1 and B30 can be adjusted by gating, tuning the filters or adjusting the Q factor or other filter characteristic, for example. The band frequency separation is here 135 MHz (band B1 in reception being 2110 to 2170 MHz, and band B30 in transmission being 2305 to 2315 MHz). The impact on insertion loss would be quite significant as described above. A tunable diplexer 116 helps to resolve this limitation by mitigating insertion losses. In the case of B1+B7 at 302, the cross-over frequency can be set to around 2340 MHz, and in the case of B2+B30 at 304 it can be set to around 2150 MHz for processing signals in CA mode. This will lower the losses due to a higher band frequency separation, 135 MHz for a static diplexer versus approximately 300 MHz for a tunable diplexer, which is further detailed and illustrated in example architecture of FIG. 4 below.

Figure 4:
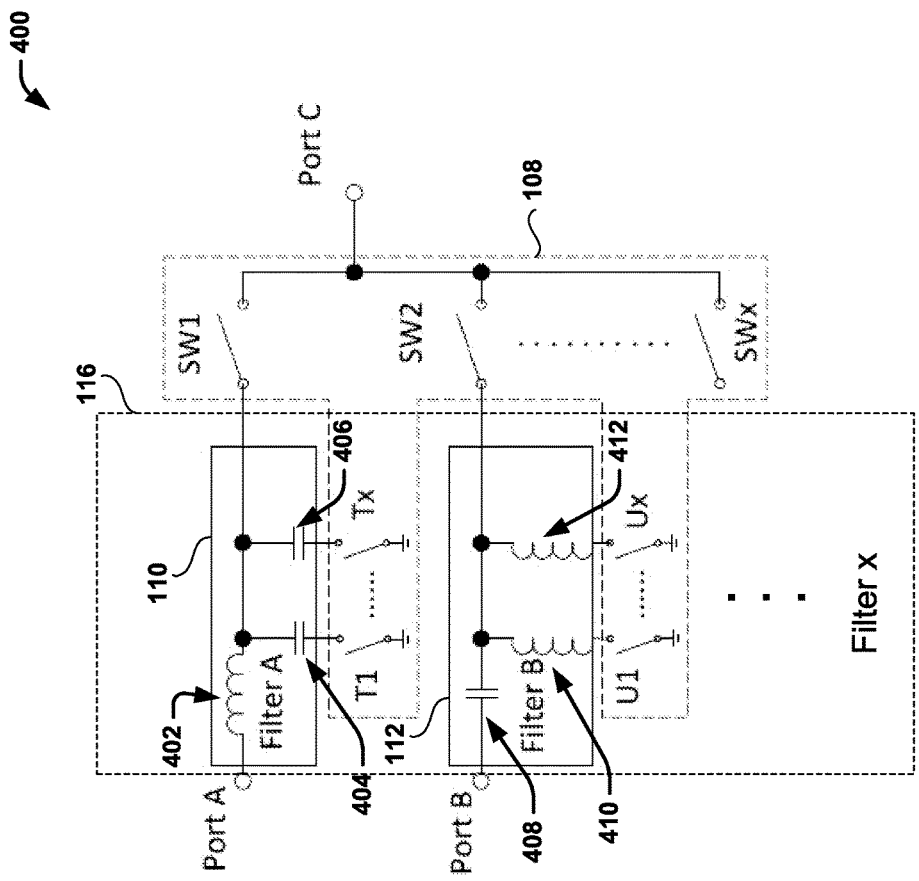
FIG. 4 is a block diagram illustrating another wireless communication system or device according to various aspects described.

Referring to FIG. 4, illustrated is an example of a tunable diplexer in accordance with various aspects being described for wireless communications. The diplexer 116 is configured to change the filter characteristic (e.g., out-of-band attenuation, out-of-band impedance, Q factor of the filters corresponding to each band, cross over frequency, or the like) of the filters A 110 or B 112, and thus change the characteristics of the diplexer 116 overall for simultaneously processing at least two aggregated bands.

In one embodiment, the processor 102 can operate to control the filter characteristics depending on signal properties of operating bands at the front end ports A or B based on the mode of operation, the particular operating bands of simultaneous operation, or depending on the frequency separation between the bands of simultaneous operation. For example, as with LTE or other wireless communication protocols, the embodiments being described can be applied based on the mode of operation (e.g., carrier aggregation mode, non-carrier aggregation mode, the bypass mode, or other modes).

In the non-CA mode (or legacy mode) of operation or during single transmission/reception, the bypass mode of the diplexer 116 can be selected (via the processor 102 controlling switches 118 or 120) based, for example, on a threshold for a reduction of losses (e.g. above 0.5 dB, 1 dB, or otherwise predetermined), or for reducing the insertion loss below a threshold (e.g., such as 0.5, 1 dB, or otherwise predetermined). In the CA mode or during multi-transmission/multi-reception, the diplexer 116 can be selected via the processor 102 signalling the opening of switches 118 ad 120 for mapping multiple bands to a single port (e.g., port C). In response to the diplexer 116 having to support multiple CA combinations (e.g. B1+B7, B2+B30, or otherwise selected by the processor 102), then the diplexer or filter characteristic(s) can be changed depending on the CA combination by using the tunability feature of the diplexer 116 or the filters (filter A 110, filter B 112) comprising the diplexer 116. Cross-over frequency and filter characteristic can be selected, for example, depending on the frequency separation of the operating bands and the frequency range occupied by each band. For example, the cross-over frequency of the diplexer 116 can be set to a mid-frequency between the simultaneously operating bands or their respective frequency ranges of operation.

The filter A, for example, can be an LC low pass filter comprising an inductor 402, and any number of shunts comprising capacitors, such as capacitor shunt 404, capacitor shunt 406 or addition shunts. These shunts can be connected or disconnected from the filter or a ground via the processor 102 controlling the signalling of corresponding switches T1 . . . Tx, for example. The switches T1 . . . Tx can operate to selectively connect and disconnect the capacitors of each shunt to ground. If the filter characteristic is altered based on one or more criteria to be met for a threshold (e.g., out-of-band attenuation, out-of-band impedance, Q factor, frequency separation as related to insertion losses or not, or other characteristics), for example, the processor 102 can signal one or more switches T1 . . . Tx to connect or disconnect capacitor shunts accordingly.

Likewise, the other filter (e.g., filter B 112) that is integrated to form the diplexer 116 for carrier aggregation processes, can be an LC high pass filter that comprises a capacitor 408 and one or more inductor shunts 410 and 412 for controlling filter characteristics of the filter B 112, either in conjunction with dynamically controlling the filter characteristics of filter A 110 or independently depending on one or more criteria targets being demanded from the CA bands (e.g., out-of-band attenuation, out-of-band impedance, Q factor, frequency separation as related to insertion losses or not, or other characteristics). The shunts 410, 412 or additional shunts coupled one or more inductors of the filter to ground to activate them respectively and can be connected or disconnected from the filter or a ground via the processor 102 controlling the signalling of corresponding switches U1 . . . Ux, for example. If the filter characteristic is altered based on one or more criteria to be met for a threshold, the processor 102 can signal one or more of the switches U1 . . . Ux to connect or disconnect the shunts accordingly until the filter characteristic is met or optimal for processing in CA mode the particular bands aggregations.

In non-CA mode or legacy mode only a single operating band is being utilized, then a switch SW 1 could be opened to disconnect filter A 110 and SW2 closed to connect filter B, for example, for one band. However, this means that the filter A is still in place and could still effect, or increase the insertion loss of band A because filter A is still a part of the diplexer. To further decrease insertion losses, one or more switches T1 . . . Tx can also further disconnect filter A 110 from ground, effectively disconnecting the capacitor of each shunt from the ground and more completely the filter A 110. This could then further reduce the losses because the filter function further gets lost and losses are further reduced, mitigated or eliminated. If all shunt elements are disconnected from the ground, then the filter function can be eliminated completely. So this is a technique to also further disconnect the filter A 110, for example, from the antenna switch(es) 108 and to reduce the losses. The device 101 then further supports both CA modes and non-CA (legacy) modes of data stream processing with no additional losses. In non-CA (legacy) mode, the same performance or similar signal strength can be facilitated as a wireless communication device without an additional CA mode of operation.

In another embodiment, for example, the cut-off frequency of filter A 110 can be changed by opening and closing the switches T1 . . . Tx. If a switch Tx, for example, is closed, the filter capacitance increases, thereby lowering the cut-off frequency of the filter A 110. Likewise, the same operation works for the inductors or inductor shunts in filter B 112 with respect to the inductance of the filter 112 via the switches U1 . . . Ux.

In another embodiment, the diplexer 116 is switchable, providing for both a switchable and a tunable diplexer, which further closes the gap between legacy diplexers (e.g., SAW diplexers) and high performance, but expensive multiplexers such as FBAR/BAW multiplexers. The diplexer 116 can be a switchable diplexer that enables multiplexing of critical combinations (e.g., 3GPP bands B1+7, bands B3+7, bands B2+30, or other combinations between different operating bands), which can provide almost uncompromised performance while operating in legacy, or non-CA mode, and good performance in CA mode.

For example, a switch SW1 connects the filter A 110 to the common/antenna port C, and a switch SW2 also connects the filter B 112 to the common port C. Additional switches can further connect additional filters (e.g., filter Z) of no set number to the common port C or other antenna ports, for example. The switches can be utilized as antenna switches 108 that would operate in wireless device to couple antennas and antenna ports to one or more diplexers, triplexers or the like.

In non-CA mode, either single band is active (e.g., Band A via filter A 110, or Band B via filter B 112). If a signal shall be received or transmitted in Band A, for example, then the switch SW1 is closed and the output of filter A 112 is connected to the port C, or an antenna (not shown) coupled thereto. Likewise, the same is valid for Band B. In CA mode, when both bands are active, the switches SW1 and SW2 are closed to simultaneously connect filter A 110 and filter B 112 to the port C. As such, the switches 108 can operate at the filter outputs to enable or disable the diplexer 116 as a diplexer function, which is enabled by simultaneously connecting the two filters 110 and 112 to the same port C. Any number of filters can be added to form a diplexer, and other filters can be selected that operate to filter bands of different frequencies, different frequency ranges, operating bands, or similar ones.

Filter A 110 or filter B 112, for example, could be a high pass, a low pass, a band pass filter, or any other particular filter. However, the output terminals of the filters are not directly tied together or permanently connected to one another, but rather are dynamically connected or disconnected for forming different types of diplexer 116 in one set of antenna switches 108, for example. The filters A 110 and B 112 are connected to the antenna switch 108 instead of one another directly. If the device 101 is operating in non-CA mode (legacy mode), then the processor 102 can signal the close of just one arm of the switch 108, which means that just one filter A 110, B 112 or another filter is in place. When in CA mode, the processor 102, for example, can signal the close of just two switch arms, which means that switch arms connect to filter A 110 and B 112, respectively, in which both filters are now in parallel connection to one another for a diplexer function/operation.

When determining the filter characteristic, it can be important to provide a high impedance at the common port C in the aggregated other band to block interference noise, or in general a high impedance can be utilized to achieve a high isolation between the bands and low insertion loss. This means that filter A 110, for example, can then provide a high impedance in Band B at the common port C, as an out-of-band impedance. The high impedance is either achieved by an additional phase shifter or by dedicated design of the filter network via tunable shunts or other electrical elements. Diplexers, such as the diplexer 116, can combine a high pass filter with a low pass filter, but the other filters or combinations are not precluded and envisioned by one of ordinary skill in the art. The high filter/low filter combination can provide the high impedance characteristic in the other aggregated band, but this need not be limited in this embodiment, nor any particular filter topology. In this manner, the diplexer 116 or other diplexers of the device 101 can be dynamically formed and unformed based on criteria and current communication or network conditions, such as modes of operation, operating bands being processed or selected for processing, ports being enabled for such operating bands, frequency separations between any two signals, band frequency separation, frequency range separations, cross over frequency, out-of-band attenuation, out-of-band impedance, insertion loss thresholds, Q factors or other criteria or filter characteristics, for example.

Figure 5:
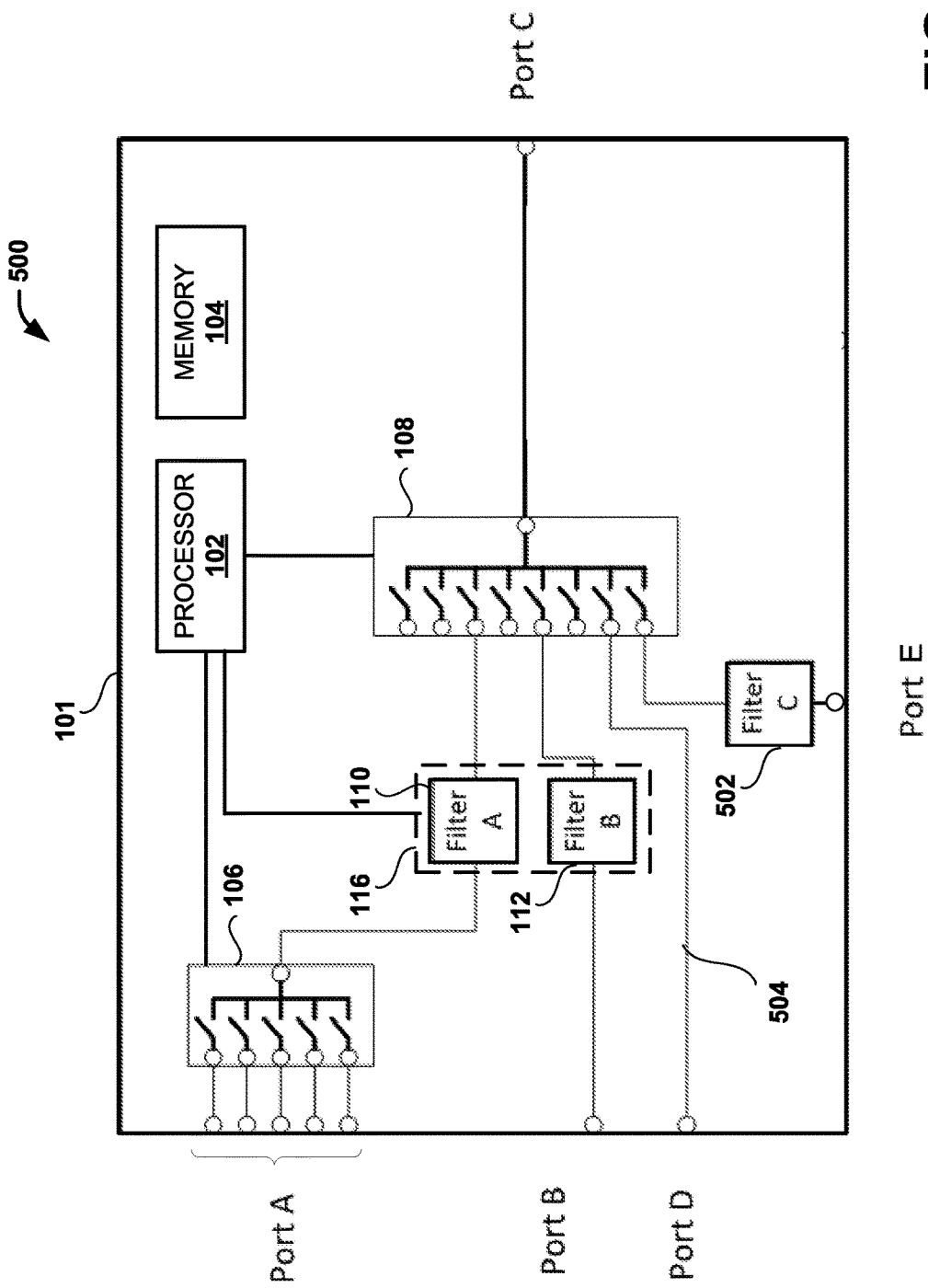
FIG. 5 is a block diagram illustrating another wireless communication system or device according to various aspects described.

Referring to FIG. 5, illustrated is wireless communication system in accordance with various aspects being described. In the case of a carrier aggregation mode of operation, receive processing paths (not shown) or transmit processing paths (not shown), for example, can be coupled to any one of front end ports A, B, D or E of the device 101, which can each have additional ports (e.g., as in port A) that are designated to different signals of corresponding frequencies within the same frequency range or of the same operating band. Each set of ports (front end ports or different antenna/common ports) can have different associated frequency ranges among one another, in which signals are received/transmitted within the corresponding frequency range, or also be associated with different operating bands. The front end ports A, B, D, or E can selectively operate simultaneously in carrier aggregation mode for processing signals being received in two or more bands. The control and selectivity of operating bands or front end ports, for example, can be signalled for activation by the processor 102 based on one or more criteria as discussed herein. Although embodiments herein may provide examples of receive Rx carrier aggregation, this is done in an effort to simplify the description and not limit the scope of the disclosure. The embodiments described in this disclosure can also be used for transmission Tx carrier aggregation, as well as RX carrier aggregation or any other multi-transmission or multi-reception scheme.

In one embodiment, FIG. 5 illustrates an example of a system 500 that includes various embodiments discussed above. In a radio frequency (RF) front-end of the device 101, carrier aggregation utilizes RF multiplexing by selectively and dynamically forming one or more diplexers 116 as switched diplexers, which operate to separate or combine different signals/data streams simultaneously for further reception or transmission processing. The diplexer 116 can be formed dynamically and selectively by combining two of the filters 110, 112 or 502, for example, such as filter A 110 and filter B 112 together. The diplexer 116 can be selectively created from among the filters 110, 112 or 502 based on an operation mode of the device 101 such as a carrier aggregation mode, a non-carrier aggregation mode or bypass mode for transmitting or receiving different signals, the different frequency ranges or operating bands being selectively aggregated via the processor 102 at the ports A, B, D or E for transmission or reception of signals, a crossover frequency between the frequency ranges of the aggregated bands, or other transmission or filter characteristics (e.g., an out-of-band impedance, an out-of-band attenuation, cross over frequency, or other characteristic/criteria).

In one embodiment, the set of switches 108 can comprise switching circuitry that couples one or more diplexers 116 to the antenna port C according to a switching signal received or controlled by the processor 102, for example. The port C can also comprise multiple ports, other than a single port, with different antennas connected to the different ports, respectively. By selectively forming the diplexer 116 from among multiple different filters with different characteristic ranges or electronic elements depending on the filter type (low pass, band pass, high past, etc.), or a single filter connection or a single line without a filter, the set of switches 108 can operate to create the diplexer 116 dynamically as a switchable diplexer.

In another embodiment, the processor 102, or other processor (e.g., a baseband processor in the device 101, radio frequency integrated circuit or other processing component) can selectively form pathway connections to the dynamically formed diplexer 116 by activating one or ports within one or more group of ports (e.g., port A) based on properties of the input signals/data streams, or criteria such as frequency, cross over frequency, out-of-band impedance, out-of-band attenuation, properties of the aggregated signal, the filter characteristics, operating band, frequency range of the operating band or the input signal, mode of operation (CA or non-CA) or the other criteria, for example.

The port A can comprise a low frequency range, while port E or other ports (e.g., port B) can comprise different frequency range ports (e.g., a high or mid-range). Based on the data signals being processed or received, the filters 110, 112, or 512 can be dynamically connected together, and disconnected in order to facilitate dynamic and on-the-fly formation of the diplexer 110. Such a dynamic connection and disconnection of the filters forming the diplexer 116 further enables reduction of insertion losses, similar to the bypass switches 118 or 120 discussed in relation to FIG. 1 that disconnect the diplexer in response to a non-carrier aggregation mode or bypass mode of operation.

The switchable diplexer 116 can be combined or connected directly without a permanent connect, for example, by utilizing the set of antenna switches coupled to the antenna/common port C, as discussed above. Although the diplexer 116, is dynamically formed, which reduces insertion loss of a diplexer when not use, such as in non-CA modes, the filters 110, 112, or 502 can also be similar configured with or without bypass switches (e.g., bypass switches 118 and 120) for further operability and selectivity depending on one or more different architectures of the wireless communication device 101, for example. One of ordinary skill in the art can appreciate that various other architectures can also be utilized in accordance with the embodiments disclosed.

Figure 6:
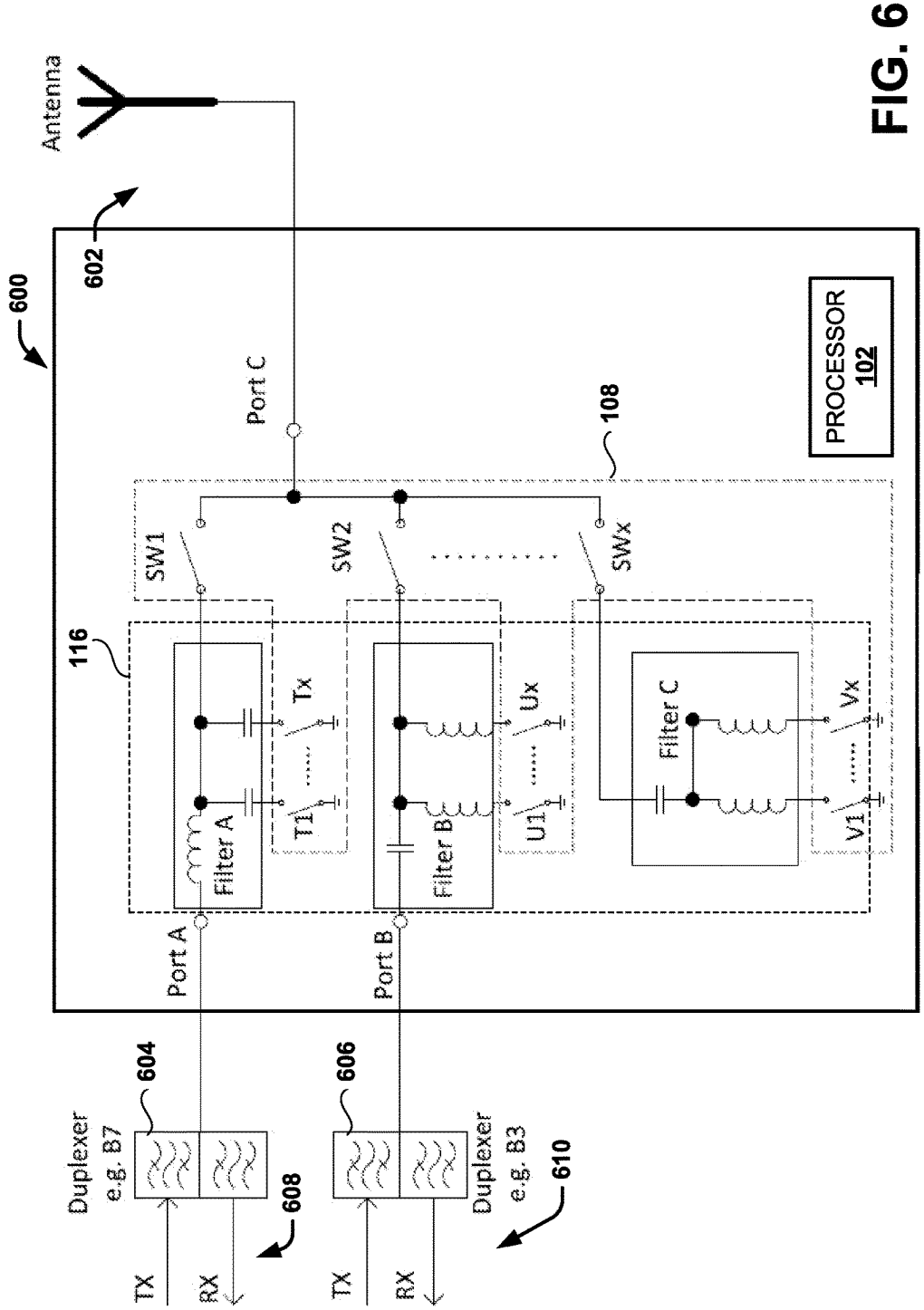
FIG. 6 is a block diagram illustrating another wireless communication system or device according to various aspects described

Referring now to FIG. 6, illustrates is another example of a wireless device. The diplexer 116 is integrated as a dynamically switchable diplexer that can form from different indirect connections and disconnections of various filters via the switches 108. In addition, the filters 110, 112 or 502 can be tunable in order to change corresponding filter characteristics, similarly as discussed with respect to FIG. 4 above.

The tunable diplexer function can be achieved by removing or adding inductive and/or capacitive filter elements by means of tuning switches T1 . . . Tx, U1 . . . Ux, V1 . . . Vx. By doing this, the cut-off frequency of the filters A, B, C etc., of the device 101 can be changed depending on the band combination/aggregation and frequency separation of the data stream/signals or corresponding ranges. As an example, a frequency A (located in Band A) could be about 1500 MHz, and frequency B could be about 1800 MHz. In this case, the cross-over frequency of the diplexer 116 could be selected dynamically by the processor 102 to be around 1650 MHz, for example. The cut-off frequencies of filter A 110 and filter B 112 can be set to realize this cross over frequency. Now, frequency B can be shifted to about 1900 MHz, which allows to the device 101 or processor 102 to shift or operate with the cross-over frequency to 1700 MHz, which is facilitated by a tuning of the cut-off frequencies of the filters A 110, or B 112, for example. By doing this, the cut-off frequency of filter A 110 can be moved away from band A, which also further reduces the insertion loss in band A. As such, the cross-over frequency of the diplexer 116 can be changed by adding or removing filter elements, such as capacitive or inductive shunts to ground, and thereby subsequently change the cross-over frequency of the diplexer 116 depending on frequency separation between the bands and the CA combination (band combination).

In one embodiment, at least one or all of the switches (e.g., antenna switches 108, tuning switches T1 . . . Tx, U1 . . . Ux, V1 . . . Vx, or front end port switches 106, 107, etc.) can be one silicon on insulator (SOI) die, system on chip (SOC), or substrate, for example, as in CMOS technology to realize switches of the device 101. In particular, the existing antenna switch(es) 108 can be used to provide the switching elements for forming the diplexer 116 as a switchable diplexer and for coupling the formed diplexer 116 to the antenna 602. This is a further advantage because the set of antenna switches 108 can be integrated with or realized in SOI technology. Having at least one or all the switches of the device 101 on the same SOI die can decrease area or volume being utilized on the die, and thus minimizing cost. The capacitors and inductors can be discrete components, but also integrated e.g. on SOI die (passive integration), which can be available for the antenna switch function, and could also be a separate die to realize the tunable diplexer function. One of ordinary skill in art will appreciate different combinations of components being partitioned and integrated on the SOI.

In CA mode, either SW1 (to support band B7) or SW2 (to support band B3) is closed. In CA mode B3+7 SW1 and SW2 can be closed to form a diplexer 116, for example. The switches T1 . . . Tx and U1 . . . Ux can be used to optimize the transfer characteristic of the diplexer 116. Additionally, the duplexers 604 and 606, respectively can also correspond to a group of ports A and B respectively, or any one port within a plurality of ports A or B, for example, along with one or more receive and transmit paths or chains 608, 608, respectively to illustrate how the switchable diplexer 116 is embedded in the front end component or system of the wireless communication device 101.

The described band combinations within this disclosure (e.g. B3+7) reflect examples that can be important use cases as of today. However, no particular aggregation or combination of one or more bands is limited in the disclosure and one of ordinary skill in the art will appreciate that any combination of aggregated bands is envisioned and the embodiments disclosed in principle can be used for all CA combinations, such as any combination with a frequency gap larger than about 100 MHz for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
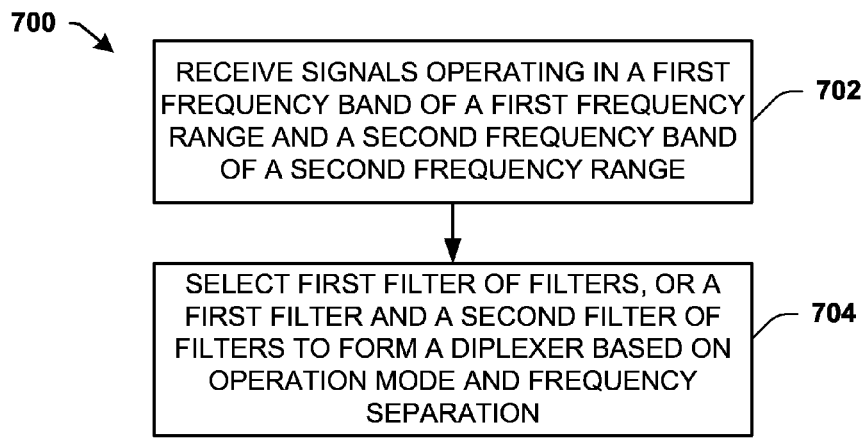
FIG. 7 is flow diagram illustrating a method of a wireless communication system or device according to various aspects described.

Referring to FIG. 7, illustrated is a method 700 for a communication device in separating or combining frequency bands for different operating modes (e.g., CA mode and non-CA mode). The method initiates and at 702 comprises receiving, from an antenna port (e.g., port C) or a plurality of front end ports (e.g., 106 or 107), signals operating in a first frequency band (e.g., band B1) of a first frequency range and a second frequency band (e.g., band B30) of a second frequency range.

At 704, the method comprises selecting a first filter (e.g., filter A 110) of a set of filters or the first filter and a second filter (e.g., filter B 112) of the set of filters (e.g., filter A 110, filter B, filter C, Filter D, filter E, etc.) to form a diplexer (e.g., diplexer 116), configured to provide the signals to the antenna port or the plurality of front end ports, based on an operation mode of a plurality of operation modes and a frequency separation between the first frequency range and the second frequency range of the signals.

In response to the device 101 operating in the operation mode (e.g., non-CA mode), bypassing the first filter (e.g., filter A 110) and the second filter (e.g., filter B 112) forming the diplexer 116 to provide the signals in a single operating band.

Selecting the first filter and the second filter can, for example, comprise selecting the first filter and the second filter from among at least three filters (e.g., filter A 110, filter B, filter C, Filter D, filter E, etc.) of the set of filters, which can be different filter types, based on the frequency separation between a first signal of the first frequency range and a second signal of the second frequency range to be concurrently transmitted or received. For example, the processor 102 can operate by selectively coupling, via a first plurality of switches (e.g., switches 106), the first filter to a first plurality of front end ports (e.g., port A) corresponding to different frequency bands in the first frequency range based on a crossover frequency between the first frequency range and the second frequency range. The first frequency range, for example, can be lower than the second frequency range corresponding to another set (one or more) or group of ports. Additionally, a second plurality of switches can selectively couple, via control by the processor 102, the second filter to a second plurality of front end ports corresponding to different frequency bands in the second frequency range based on the crossover frequency between the first frequency range and the second frequency range. In addition, the filter(s) can be tuned for a filter characteristic to lower an insertion loss in response to a non-carrier mode being activated and only the first filter of the set of filters being selected.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
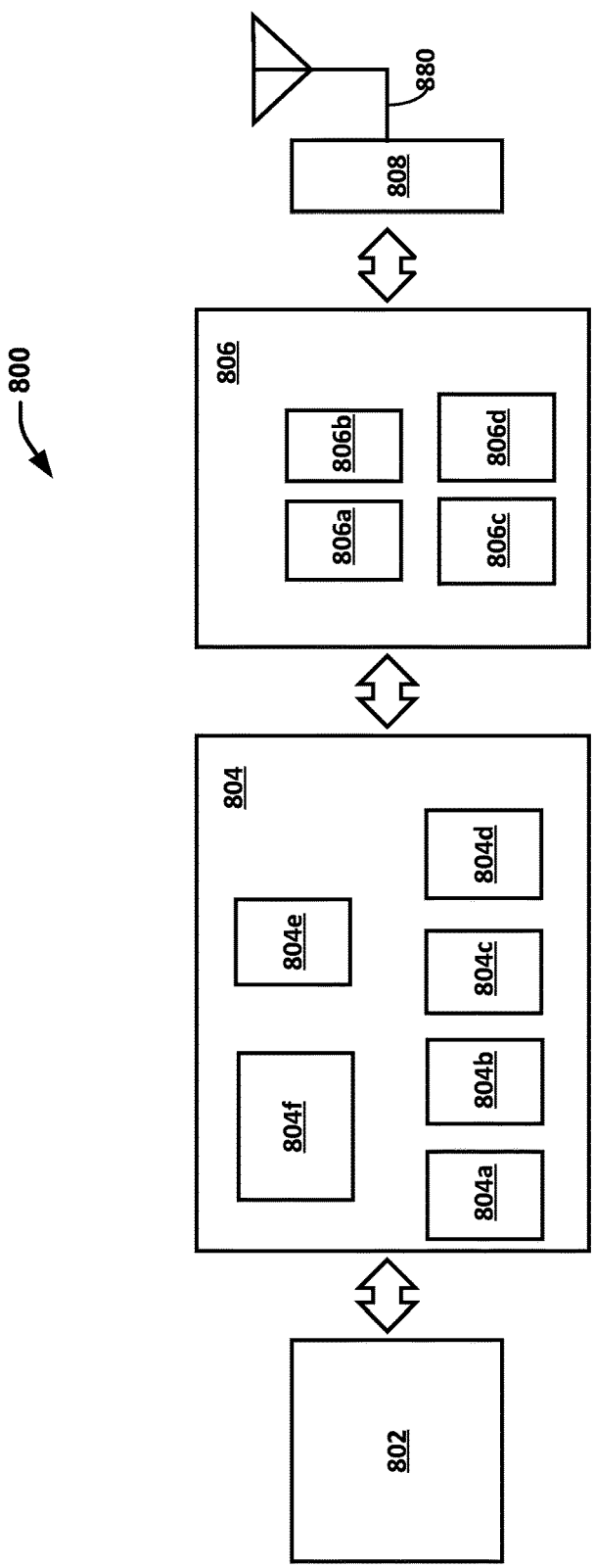
FIG. 8 is an example communication system environment for implementing one or more embodiments being disclosed.

Embodiments described herein can be implemented into a system using any suitably configured hardware and/or software. FIG. 8 illustrates, for one embodiment, example components of a User Equipment (UE) device 800. In some embodiments, the UE device 800 (e.g., the wireless communication device 101) can include application circuitry 802, baseband circuitry 804, Radio Frequency (RF) circuitry 806, front-end module (FEM) circuitry 808 and one or more antennas 880, coupled together at least as shown.

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 804 can include circuitry such as, but not limited to, one or more single-core or multi-core processors. The baseband circuitry 804 can include one or more baseband processors and/or control logic to process baseband signals received from a receive signal path of the RF circuitry 806 and to generate baseband signals for a transmit signal path of the RF circuitry 806. Baseband processing circuitry 804 can interface with the application circuitry 802 for generation and processing of the baseband signals and for controlling operations of the RF circuitry 806. For example, in some embodiments, the baseband circuitry 804 can include a second generation (2G) baseband processor 804*a*, third generation (3G) baseband processor 804*b*, fourth generation (4G) baseband processor 804*c*, and/or other baseband processor(s) 804*d* for other existing generations, generations in development or to be developed in the future (e.g., fifth generation (5G), 6G, etc.). The baseband circuitry 804 (e.g., one or more of baseband processors 804*a-d*) can handle various radio control functions that enable communication with one or more radio networks via the RF circuitry 806. The radio control functions can include, but are not limited to, signal modulation/demodulation, encoding/decoding, radio frequency shifting, etc. In some embodiments, modulation/demodulation circuitry of the baseband circuitry 804 can include Fast-Fourier Transform (FFT), precoding, and/or constellation mapping/demapping functionality. In some embodiments, encoding/decoding circuitry of the baseband circuitry 804 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 804 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804*e* of the baseband circuitry 804 can be configured to run elements of the protocol stack for signaling of the PHY, MAC, RLC, PDCP and/or RRC layers. In some embodiments, the baseband circuitry can include one or more audio digital signal processor(s) (DSP) 804*f*. The audio DSP(s) 804*f* can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 804 and the application circuitry 802 can be implemented together such as, for example, on a system on a chip (SOC).

In some embodiments, the baseband circuitry 804 can provide for communication compatible with one or more radio technologies. For example, in some embodiments, the baseband circuitry 804 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol can be referred to as multi-mode baseband circuitry.

RF circuitry 806 can enable communication with wireless networks using modulated electromagnetic radiation through a non-solid medium. In various embodiments, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some embodiments, the RF circuitry 806 can include a receive signal path and a transmit signal path. The receive signal path of the RF circuitry 806 can include mixer circuitry 806*a*, amplifier circuitry 806*b* and filter circuitry 806*c*. The transmit signal path of the RF circuitry 806 can include filter circuitry 806*c* and mixer circuitry 806*a*. RF circuitry 806 can also include synthesizer circuitry 806*d* for synthesizing a frequency for use by the mixer circuitry 806*a* of the receive signal path and the transmit signal path. In some embodiments, the mixer circuitry 806*a* of the receive signal path can be configured to down-convert RF signals received from the FEM circuitry 808 based on the synthesized frequency provided by synthesizer circuitry 806*d*. The amplifier circuitry 806*b* can be configured to amplify the down-converted signals and the filter circuitry 806*c* can be a low-pass filter (LPF) or band-pass filter (BPF) configured to remove unwanted signals from the down-converted signals to generate output baseband signals. Output baseband signals can be provided to the baseband circuitry 804 for further processing. In some embodiments, the output baseband signals can be zero-frequency baseband signals, although this is not a requirement. In some embodiments, mixer circuitry 806*a* of the receive signal path can comprise passive mixers, although the scope of the embodiments is not limited in this respect.

In some embodiments, the mixer circuitry 806*a* of the transmit signal path can be configured to up-convert input baseband signals based on the synthesized frequency provided by the synthesizer circuitry 806*d* to generate RF output signals for the FEM circuitry 808. The baseband signals can be provided by the baseband circuitry 804 and can be filtered by filter circuitry 806*c*. The filter circuitry 806*c* can include a low-pass filter (LPF), although the scope of the embodiments is not limited in this respect.

In some embodiments, the mixer circuitry 806*a* of the receive signal path and the mixer circuitry 806*a* of the transmit signal path can include two or more mixers and can be arranged for quadrature downconversion and/or upconversion respectively. In some embodiments, the mixer circuitry 806a of the receive signal path and the mixer circuitry 806a of the transmit signal path can include two or more mixers and can be arranged for image rejection (e.g., Hartley image rejection). In some embodiments, the mixer circuitry 806a of the receive signal path and the mixer circuitry 806a can be arranged for direct downconversion and/or direct upconversion, respectively. In some embodiments, the mixer circuitry 806a of the receive signal path and the mixer circuitry 806a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 806 can include analog-to-digital converter (ADC) and digital-to-analog converter (DAC) circuitry and the baseband circuitry 804 can include a digital baseband interface to communicate with the RF circuitry 806.

In some dual-mode embodiments, a separate radio IC circuitry can be provided for processing signals for each spectrum, although the scope of the embodiments is not limited in this respect.

In some embodiments, the synthesizer circuitry 806d can be a fractional-N synthesizer or a fractional N/N+8 synthesizer, although the scope of the embodiments is not limited in this respect as other types of frequency synthesizers can be suitable. For example, synthesizer circuitry 806d can be a delta-sigma synthesizer, a frequency multiplier, or a synthesizer comprising a phase-locked loop with a frequency divider.

The synthesizer circuitry 806d can be configured to synthesize an output frequency for use by the mixer circuitry 806a of the RF circuitry 806 based on a frequency input and a divider control input. In some embodiments, the synthesizer circuitry 806d can be a fractional N/N+8 synthesizer.

In some embodiments, frequency input can be provided by a voltage controlled oscillator (VCO), although that is not a requirement. Divider control input can be provided by either the baseband circuitry 804 or the applications processor 802 depending on the desired output frequency. In some embodiments, a divider control input (e.g., N) can be determined from a look-up table based on a channel indicated by the applications processor 802.

Synthesizer circuitry 806d of the RF circuitry 806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 806 can include an IQ/polar converter.

FEM circuitry 808 can include a receive signal path which can include circuitry configured to operate on RF signals received from one or more antennas 880, amplify the received signals and provide the amplified versions of the received signals to the RF circuitry 806 for further processing. FEM circuitry 808 can also include a transmit signal path which can include circuitry configured to amplify signals for transmission provided by the RF circuitry 806 for transmission by one or more of the one or more antennas 880.

In some embodiments, the FEM circuitry 808 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 806). The transmit signal path of the FEM circuitry 808 can include a power amplifier (PA) to amplify input RF signals (e.g., provided by RF circuitry 806), and one or more filters to generate RF signals for subsequent transmission (e.g., by one or more of the one or more antennas 880.

In some embodiments, the UE device 800 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a communication device comprising an antenna port configured to concurrently transmit or receive data streams operating in different frequency bands. A plurality of filters is configured to selectively couple to the antenna port and selectively form a diplexer to combine or separate the data streams operating in the different frequency ranges, based on an operation mode and a frequency separation between the different frequency ranges of the data streams.

Example 2 is a communication device including the subject matter of example 1, wherein the diplexer comprises a bypass switch configured to disable the diplexer and reduce an insertion loss in response to a non-carrier aggregation mode of operation.

Example 3 is a communication device including the subject matter of examples 1-2, including or omitting elements, wherein, in response to the operation mode and the frequency separation, the diplexer is configured to activate one or more switches that bypass the diplexer and directly provide the data streams of a single frequency band to the antenna port or a front end port, and deactivate the one or more switches that bypass the diplexer to activate the diplexer to combine or separate the data streams operating in the different frequency ranges.

Example 4 is a communication device including the subject matter of examples 1-3, including or omitting elements, further comprising a first plurality of front end ports, coupled to a first plurality of switches, configured to transmit or receive first data streams operating in a first frequency range along a first plurality of transmit processing paths or a first plurality of receive processing paths, respectively; a second plurality of front end ports, coupled to a second plurality of switches, configured to transmit or receive second data streams operating in a second frequency range along a second plurality of transmit processing paths or a second plurality of receive processing paths, respectively; and a processor configured to selectively couple a first front end port of the first plurality of front end ports to a first filter of the plurality of filters, via the first plurality of switches, and selectively couple a second front end port of a second plurality of front end ports to a second filter of the plurality of filters and the antenna port, in response to a carrier aggregation mode and based on the frequency separation between the first data streams and the second data streams.

Example 5 is a communication device including the subject matter of examples 1-4, including or omitting elements, further comprising: a plurality of antenna switches individually coupled to a filter of the plurality of filters and selectively coupled to the antenna port, and configured to selectively combine at least two filters of the plurality of filters to form the diplexer to the antenna port based on the frequency separation between first data streams of a first frequency range and second data streams of a second frequency range to be concurrently transmitted or received.

Example 6 is a communication device including the subject matter of examples 1-5, including or omitting elements, wherein the plurality of antenna switches is configured to close at least two switch arms to form the diplexer, and, in response to a non-carrier mode of operation, close only one switch arm to connect one filer to the antenna port.

Example 7 is a communication device including the subject matter of examples 1-6, including or omitting elements, further comprising a first plurality of switches coupled to a first filter of the plurality of filters and a first plurality of front end ports corresponding to the different frequency bands in a first frequency range of the frequency ranges; and a second plurality of switches coupled to a second filter of the plurality of filters and a second plurality of front end ports corresponding to different frequency bands in a second frequency range of the frequency ranges, wherein the first frequency range is lower than the second frequency range.

Example 8 is a communication device including the subject matter of examples 1-7, including or omitting elements, further comprising a first plurality of filter tuning switches, respectively coupled to conductive shunts of the first filter, configured to selectively alter a filter characteristic of the first filter based on the frequency separation between the frequency ranges of the data streams; and a second plurality of filter tuning switches respectively coupled to conductive shunts of the second filter, configured to selectively alter a filter characteristic of the second filter based on the frequency separation between the frequency ranges of the data streams.

Example 9 is a communication device including the subject matter of examples 1-8, including or omitting elements, further comprising a processor configured to select a first filter and a second filter from among at least three filters of the plurality of filters and selectively create a filter combination coupled together to form the diplexer coupled to the antenna port, based on a crossover frequency from the frequency separation between a first frequency range associated with a first operational frequency band of a first data stream and a second frequency range associated with a second operational frequency band of a second data stream to be concurrently transmitted or received via the antenna port.

Example 10 is a communication device including the subject matter of examples 1-9, including or omitting elements, further comprising a plurality of filter tuning switches, respectively coupled to conductive shunts of at least one of the first filter and the second filter, configured to selectively alter a filter characteristic of the at least one of the first filter and the second filter based on the frequency separation between the first data stream of the first frequency range and the second data stream of the second frequency range to be concurrently transmitted or received via the antenna port.

Example 11 is a communication device including the subject matter of examples 1-10, including or omitting elements, wherein the filter characteristic comprises at least one of an out of band attenuation or an out of band impedance of the first data stream for the second filter, or of the second data stream for the first filter.

Example 12 is a communication device including the subject matter of examples 1-11, including or omitting elements, further comprising a plurality of antenna switches configured to selectively determine at least two filters to form the diplexer from among three or more filters of the plurality of filters or one of the filters of the plurality of filters, to couple to the antenna port, based on at least one of: a carrier aggregation mode and a non-carrier aggregation mode, a selective aggregation of a first data stream of a first frequency range within a first operating band and a second data stream of a second frequency range within a second operating band, or a crossover frequency between the first frequency range and the second frequency range.

Example 13 is a communication system, comprising an antenna port configured to concurrently transmit or receive signals operating in a first frequency band of a first frequency range and a second frequency band of a second frequency range; and a processor configured to select a first filter and a second filter from a set of filters to form a diplexer based on an operation mode of the diplexer and a frequency separation between the first frequency range and the second frequency range.

Example 14 is a communication system including the subject matter of example 13, wherein the processor is further configured to change a selection of the first filter and the second filter from among three or more filters to form the diplexer based on a change in the frequency separation between the signals concurrently being transmitted or received via the antenna port.

Example 15 is a communication system including the subject matter of examples 13-14, including or omitting elements, wherein the processor is further configured to decrease an insertion loss from the diplexer by bypassing the first filter and the second filter via one or more bypass switches of the diplexer in response to operating in a non-carrier aggregation mode, and enable a decrease in the frequency separation between the signals being transmitted or received via the antenna port in response to operating in a carrier aggregation mode.

Example 16 is a communication system including the subject matter of examples 13-15, including or omitting elements, further comprising: a first plurality of switches, coupled to a first plurality of front end ports associated with different frequency bands of the first frequency range and to the first filter, configured to selectively couple at least one of the first plurality of front end ports to the first filter based on the first frequency band and a crossover frequency between the first frequency band and the second frequency band; and a second plurality of switches, coupled to a second plurality of front end ports associated with different frequency bands of the second frequency range and to the second filter, configured to selectively couple at least one of the second plurality of front end ports to the second filter based on the second frequency band and the crossover frequency; wherein the first frequency range is lower than the second frequency range.

Example 17 is a method for a communication device comprising receiving, from an antenna port or a plurality of front end ports, signals operating in a first frequency band of a first frequency range and a second frequency band of a second frequency range; and selecting a first filter of a set of filters or the first filter and a second filter of the set of filters to form a diplexer, configured to provide the signals to the antenna port or the plurality of front end ports, based on an operation mode of a plurality of operation modes and a frequency separation between the first frequency range and the second frequency range of the signals.

Example 18 is a method including the subject matter of example 17, including or omitting elements, further comprising: in response to the operation mode, bypassing the first filter and the second filter forming the diplexer to provide the signals in a single operating band.

Example 19 is a method including the subject matter of examples 17-18, including or omitting elements, wherein the selecting the first filter and the second filter comprises selecting the first filter and the second filter from among at least three filters of the set of filters based on the frequency separation between a first signal of the first frequency range and a second signal of the second frequency range to be concurrently transmitted or received.

Example 20 is a method including the subject matter of examples 17-19, including or omitting elements, further comprising: tuning a filter characteristic of at least one of the first filter and the second filter to lower an insertion loss in response to a non-carrier mode being activated and only the first filter of the set of filters being selected.

Example 21 is a method including the subject matter of examples 17-20, including or omitting elements, further comprising: selectively coupling, via a first plurality of switches, the first filter to a first plurality of front end ports corresponding to different frequency bands in the first frequency range based on a crossover frequency between the first frequency range and the second frequency range, wherein the first frequency range is lower than the second frequency range; and selectively coupling, via a second plurality of switches, the second filter to a second plurality of front end ports corresponding to different frequency bands in the second frequency range based on the crossover frequency between the first frequency range and the second frequency range.

Example 22 is a method including the subject matter of example 17-21, including or omitting elements, further comprising: in response to the operation mode being a non-carrier aggregation mode, selecting the first filter to provide the signals in a single operating band; and in response to the operation mode being a carrier aggregation mode, selecting the first filter and the second filter to form the diplexer The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A communication device comprising:
an antenna port configured to transmit or receive data streams operating in different frequency ranges; and
a plurality of filters configured to selectively couple to the antenna port and selectively form a diplexer to combine or separate the data streams operating in the different frequency ranges, based on an operation mode and a frequency separation between the different frequency ranges of the data streams; and
a processor configured to generate a selection of filters from among at least three filters of the plurality of filters by selecting a first filter and a second filter from among the at least three filters of the plurality of filters, and selectively create a filter combination coupled together to form the diplexer by coupling the selected filters together and to the antenna port, based on a crossover frequency from the frequency separation between a first frequency range associated with a first operational frequency band of a first data stream of the data streams and a second frequency range associated with a second operational frequency band of a second data stream of the data streams, in response to the first data stream and the second data stream being concurrently transmitted or received via the antenna port in the different frequency ranges through the formed diplexer.

2. The communication device of claim 1, wherein the diplexer comprises a bypass switch configured to disable the diplexer and reduce an insertion loss in response to a non-carrier aggregation mode of operation.

3. The communication device of claim 1, wherein, in response to the operation mode and the frequency separation, the diplexer is configured to activate one or more switches that bypass the diplexer and directly provide the data streams of a single frequency band to the antenna port or a front end port, and deactivate the one or more switches that bypass the diplexer to activate the diplexer to combine or separate the data streams operating in the different frequency ranges.

4. The communication device of claim 1, further comprising:
a first plurality of front end ports, coupled to a first plurality of switches, configured to transmit or receive first data streams operating in a first frequency range along a first plurality of transmit processing paths or a first plurality of receive processing paths, respectively;
a second plurality of front end ports, coupled to a second plurality of switches, configured to transmit or receive second data streams operating in a second frequency range along a second plurality of transmit processing paths or a second plurality of receive processing paths, respectively; and
the processor further configured to selectively couple a first front end port of the first plurality of front end ports to a first filter of the plurality of filters, via the first plurality of switches, and selectively couple a second front end port of the second plurality of front end ports to a second filter of the plurality of filters and the antenna port, in response to a carrier aggregation mode and based on the frequency separation between the first data streams and the second data streams.

5. The communication device of claim 1, further comprising:
a plurality of antenna switches individually coupled to a filter of the plurality of filters and selectively coupled to the antenna port, and configured to selectively combine at least two filters of the plurality of filters to form the diplexer to the antenna port based on the frequency separation between first data streams of a first frequency range and second data streams of a second frequency range to be concurrently transmitted or received.

6. The communication device of claim 5, wherein the plurality of antenna switches is configured to close at least two switch arms to form the diplexer, and, in response to a non-carrier aggregation mode of operation, close only one switch arm to connect one filter to the antenna port.

7. The communication device of claim 1, further comprising:
a first plurality of switches coupled to a first filter of the plurality of filters and a first plurality of front end ports corresponding to the different frequency bands in a first frequency range; and
a second plurality of switches coupled to a second filter of the plurality of filters and a second plurality of front end ports corresponding to the different frequency bands in a second frequency range, wherein the first frequency range is lower than the second frequency range.

8. The communication device of claim 7, further comprising:
a first plurality of filter tuning switches, respectively coupled to conductive shunts of the first filter, configured to selectively alter a filter characteristic of the first filter based on the frequency separation between the different frequency ranges of the data streams; and
a second plurality of filter tuning switches respectively coupled to conductive shunts of the second filter, configured to selectively alter a filter characteristic of the second filter based on the frequency separation between the different frequency ranges of the data streams.

9. The communication device of claim 1, further comprising:

a plurality of filter tuning switches, respectively coupled to conductive shunts of at least one of the first filter and the second filter, configured to selectively alter a filter characteristic of the at least one of the first filter and the second filter based on the frequency separation between the first data stream of the first frequency range and the second data stream of the second frequency range to be concurrently transmitted or received via the antenna port.

10. The communication device of claim 9, wherein the filter characteristic comprises at least one of an out of band attenuation or an out of band impedance of the first data stream for the second filter, or of the second data stream for the first filter.

11. The communication device of claim 1, further comprising:
a plurality of antenna switches configured to selectively determine at least two filters to form the diplexer from among the at least three or more filters of the plurality of filters or one of the plurality of filters, to couple to the antenna port, based on at least one of:
a carrier aggregation mode and a non-carrier aggregation mode,
a selective aggregation of a first data stream of a first frequency range within a first operating band and a second data stream of a second frequency range within a second operating band, or
the crossover frequency between the first frequency range and the second frequency range.

12. A communication system, comprising:
an antenna port configured to transmit or receive signals operating in a first frequency band of a first frequency range and a second frequency band of a second frequency range; and
a processor configured to select a first filter and a second filter via a selection from a set of three or more filters to form a diplexer by coupling the first filter and the second filter together based on an operation mode of the diplexer, a frequency separation between the first frequency range and the second frequency range of the signals, and a crossover frequency from the frequency separation between the first frequency range of the first frequency band and a second frequency range of the second frequency band to transmit or receive the signals operating through the formed diplexer.

13. The communication system of claim 12, wherein the processor is further configured to change the selection of at least one of: the first filter or the second filter from among the set of three or more filters to form a different diplexer from the diplexer with one or more different filters based on a change in the frequency separation between the signals concurrently being transmitted or received via the antenna port.

14. The communication system of claim 12, wherein the processor is further configured to decrease an insertion loss from the diplexer by bypassing the first filter and the second filter via one or more bypass switches of the diplexer in response to operating in a non-carrier aggregation mode, and enable a decrease in the frequency separation between the signals being transmitted or received via the antenna port in response to operating in a carrier aggregation mode.

15. The communication system of claim 12, further comprising:
a first plurality of switches, coupled to a first plurality of front end ports associated with different frequency bands of the first frequency range and to the first filter, configured to selectively couple at least one of the first plurality of front end ports to the first filter based on the first frequency band and the crossover frequency between the first frequency band and the second frequency band; and a second plurality of switches, coupled to a second plurality of front end ports associated with different frequency bands of the second frequency range and to the second filter, configured to selectively couple at least one of the second plurality of front end ports to the second filter based on the second frequency band and the crossover frequency;

wherein the first frequency range is lower than the second frequency range.

16. A method for a communication device comprising:

receiving, from an antenna port or a plurality of front end ports, signals operating in a first frequency band of a first frequency range and a second frequency band of a second frequency range; and selecting a first filter from among a set of three or more filters, or the first filter and a second filter of the set of three or more filters to form a diplexer by coupling one or more selected filters together and to the antenna port based on an operation mode of a plurality of operation modes, a frequency separation between the first frequency range and the second frequency range of the signals, and a crossover frequency from the frequency separation between the first frequency range of the first frequency band and a second frequency range of the second frequency band, wherein the formed diplexer is configured to provide the signals to the antenna port or the plurality of front end ports to transmit or receive the data streams operating in the different frequency ranges through the formed diplexer.

17. The method of claim 16, further comprising:

in response to the operation mode, bypassing the first filter and the second filter forming the diplexer to provide the signals in a single operating band.

18. The method of claim 16, wherein the selecting the first filter and the second filter comprises selecting the first filter and the second filter from among the set of three or more filters based on the frequency separation between a first signal of the first frequency range and a second signal of the second frequency range to be concurrently transmitted or received.

19. The method of claim 16, further comprising:

tuning a filter characteristic of at least one of the first filter and the second filter to lower an insertion loss in response to a non-carrier aggregation mode being activated and only the first filter of the set of three or more filters being selected.

20. The method of claim 16, further comprising:

selectively coupling, via a first plurality of switches, the first filter to a first plurality of front end ports corresponding to different frequency bands in the first frequency range based on the crossover frequency between the first frequency range and the second frequency range, wherein the first frequency range is lower than the second frequency range; and selectively coupling, via a second plurality of switches, the second filter to a second plurality of front end ports corresponding to different frequency bands in the second frequency range based on the crossover frequency between the first frequency range and the second frequency range.

21. The method of claim 20, further comprising:

in response to the operation mode being a non-carrier aggregation mode, selecting the first filter to provide the signals in a single operating band; and in response to the operation mode being a carrier aggregation mode, selecting the first filter and the second filter to form the diplexer.

* * * * *